Oct. 27, 1953  E. RICHON  2,657,381
BLIND LANDING SYSTEM
Filed Sept. 12, 1951  3 Sheets-Sheet 1
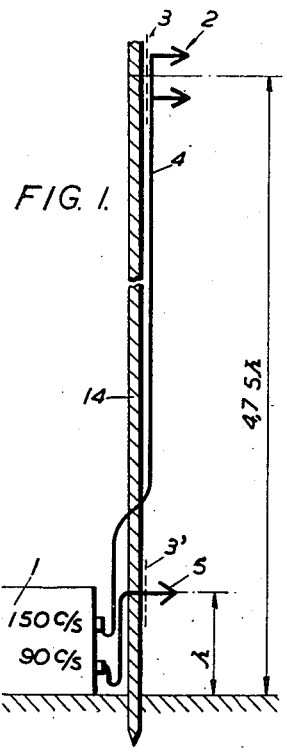
FIG. 1.
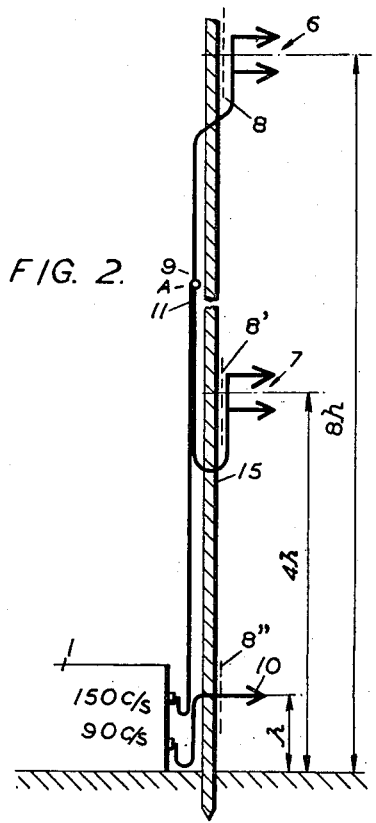
FIG. 2.
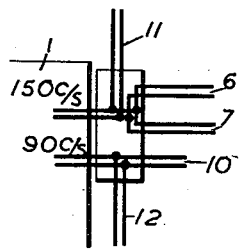
FIG. 3.a.
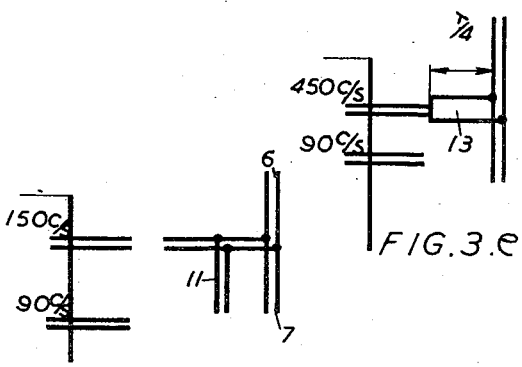
FIG. 3b.  FIG. 3.e
Inventor
EMILE RICHON
Attorney Oct. 27, 1953          E. RICHON          2,657,381

BLIND LANDING SYSTEM

Filed Sept. 12, 1951          3 Sheets-Sheet 2

Inventor
EMILE RICHON
Attorney

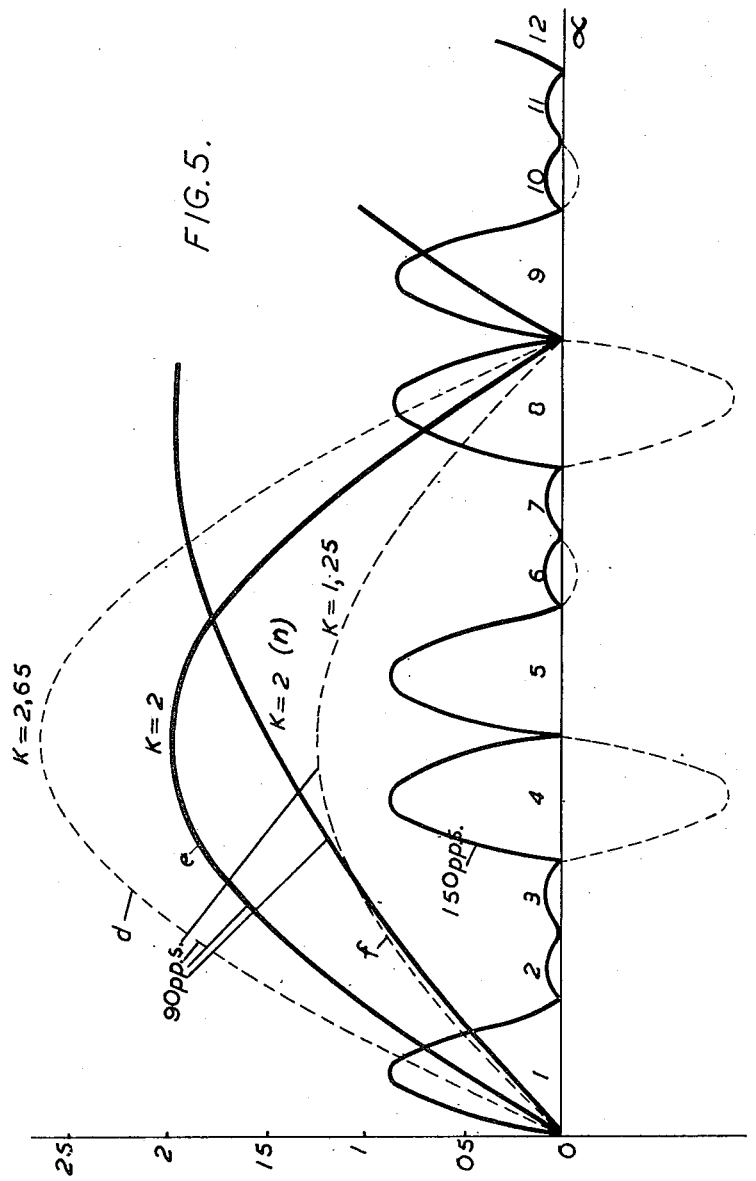

Patented Oct. 27, 1953

2,657,381

UNITED STATES PATENT OFFICE 2,657,381

BLIND LANDING SYSTEM

Emile Richon, Boulogne-Billancourt, France, assignor to International Standard Electric Corporation, New York, N. Y., a corporation of Delaware Application September 12, 1951, Serial No. 246,202
In France September 13, 1950

1 Claim. (Cl. 343—108)

The present invention relates to a blind landing system and more particularly to a system of this type utilising the radiation from a set of aerials in order to define a landing trajectory for example by the process of equisignals utilising the comparison of two high frequency electro-magnetic fields modulated by suitable different frequencies for example 150 and 90 cycles per second.

In systems of this type at present known difficulties are met particularly for obtaining a correct line of landing without false trajectories. Further, the possible adjusting margins are very reduced for obtaining a suitable ratio of the two radiated fields. Finally, the neatness of the trajectories achieved by known devices can vary only within narrow limits.

The present invention has for object to avoid these drawbacks and to provide a number of advantages which will appear from a reading of the following description whilst making use of equipment at present used for the ground installations without modifying the equipment on board of the aircrafts.

According to one of its features, the invention provides a system of aerials for defining the landing trajectory comprising three antennae located one above the other and located above the ground at heights substantially equal to $h$, $4h$ and $8h$ respectively.

Other objects, features and advantages of the present invention will appear from a reading of the following description of an embodiment of the present invention, the said description being given in connection with the accompanying drawings in which:

Fig. 1 represents a known arrangement of antennae for guiding the landing of a craft in a blind landing system.

Fig. 2 represents a new arrangement embodying features of the invention for the antennae of a guiding system for the landing curve.

Figs. 3a, 3b and 3c represent various arrangements of the means for feeding the antennae represented in Fig. 2.

Figs. 4 and 5 represent respectively the amplitude of the radiated fields in function of the angle of the landing trajectory with respect to ground first in the case of the system of Fig. 1 and then in the case of that of Fig. 2.

Figure 4:
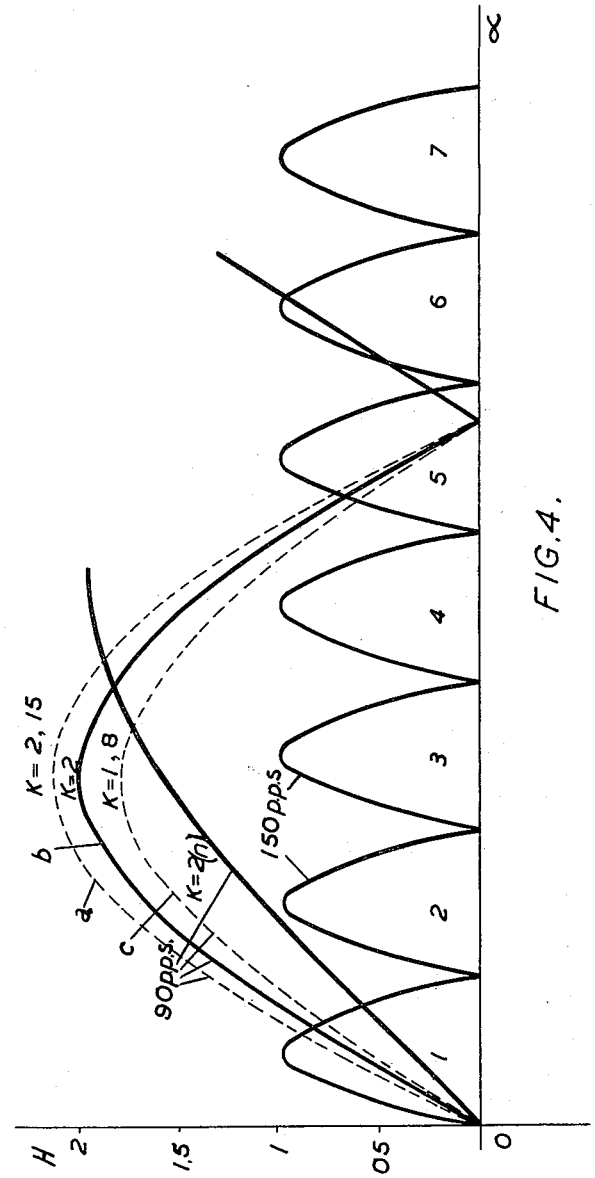

Fig. 1 represents a known antenna device adapted for defining a landing trajectory associated to a transmitter 1 supplying high frequency modulated energy on the one hand at 150 cycles and on the other hand at 90 cycles. The energy modulated at 150 cycles feeds the upper antenna 2 placed in front of a reflector 3 by means of a transmission line or feeder 4. Below the antenna 2 is placed an antenna 5 placed in front of a reflector 3', and fed by modulated energy at 90 cycles by means of the transmitter 1. Antenna 5 is placed at a height equal to $h$ above the ground whereas antenna 2 is at a height substantially equal to 4.75 above the ground. Such an arrangement supported on a vertical post 14 is well-known in the art.

The device shown in Figure 2 embodies features of the invention and comprises as that of Fig. 1 a transmitter feeding with modulated energy at 150 cycles and with suitable phases two antennae 6 and 7 placed in front of a reflector 8; 8'. These antennae 6 and 7 are fed with suitable phases by means of an impedance matching system 9 which will be described later on in details. Finally the antenna 10, placed also in front of a reflector 8'', is fed with high frequency energy modulated at 90 cycles; the assembly is carried by a vertical post 15. A feature of the device resides in this that the antenna 10 being at a height $h$ above the virtual plane representing the ground, the antenna 7 is at a height $4h$ and finally the antenna 6 is at a height $8h$.

Fig. 3a represents an experimental coupling device for the antennae 6, 7 and 10 with a transmitter 1 producing modulated waves at 150 cycles and at 90 cycles. As seen on Fig. 3a, the waves modulated at 150 cycles are applied in parallel on antenna 6 and 7 represented on Fig. 2. To obtain a suitable adjustment, an adjustable short-circuit correcting line is provided in 11 at a suitable distance from the derivation point of the feeding line. Antenna 10, fed in energy modulated at 90 cycles is connected to a transmission line delivering from transmitter 1 and is equipped with a correcting line 12 in order to obtain the desired adjustment in amplitude and in phase in antennae 6, 7 and 10.

The device represented on Fig. 3b comprises a transmitter 1 producing energy modulated at 150 cycles and at 90 cycles as in the case of Fig. 3a. The arrangement of the output circuits of transmitter 1 comprises a circuit delivering energy modulated at 90 cycles and striking directly antenna 10 at currents modulated at 90 cycles. The dividing of the energy modulated at 150 cycles is carried out in the same way as on Fig. 3a, but the derivation and the correcting line are located in the upper part of the feeding system of antennae 6 and 7, for example on A.

The adjustment of these devices is carried out once for all, so that the phases in the antennae are fixed permanently.

Another device could be the one represented on Fig. 3c which comprises an impedance transformer 13. This device can be located in the upper part of the antennae, on A for instance in Fig. 2.

Figs. 4 and 5 represent in Cartesian coordinates, on the one hand the diagram of radiation obtained by means of a known device represented in Fig. 1 whilst Fig. 5 represents the diagram of radiation obtained with the arrangement represented on Fig. 2.

On Fig. 4, it will be seen that the high frequency field modulated at 150 cycles produces a series of loops 1, 2, 3, 4, 5, 6, 7 etc., representing the amplitude of this field in relation to the angle $a$ between the line of propagation of the field with the horizontal plan. On the other hand, the curves $a$, $b$, and $c$ of the field modulated at 90 cycles have been drawn for values of $K=2, 15, 2, 1, 8$, K being the ratio between the amplitude of the modulated field at 90 cycles at a given instant and the amplitude of the field modulated at 150 cycles at the same instant. Finally the curve $K=2$ $(n)$ of the field modulated at 90 cycles and $K=2$ and for a thickness of snow on the ground equal to 60 centimeters has also been drawn modifying the position of the virtual plane representing the ground.

Fig. 5 represents the high frequency fields modulated respectively at 150 and 90 cycles in the same conditions as on Fig. 4, but utilising the arrangement of the antennae and feedings represented on Fig. 2.

The curves $d$, $e$, $f$ representing the variation of the amplitude of the field modulated at 90 cycles in relation to the angle between the direction of propagation of the field with the horizontal plane do not present any peculiarity, they are similar to those represented on Fig. 4.

On the contrary the series of loops representing the variation of the amplitude of the modulated field at 150 cycles in relation to the angle between the direction of propagation of the field and the horizontal plane undergoes variations of considerable amplitude.

Thus the second and third, the sixth and seventh, the tenth and eleventh loops etc., are reduced to a very low amplitude and loops 4, 5, 8, 9 etc., reach the amplitude of loop 1. The decrease in amplitude of loops 2 and 3 make it possible to locate the curve of the field modulated at 90 cycles within very wide limits and can vary from $K=1.25$ to $K=2.65$. A very great latitude for the adjustment of the device is thus obtained. It is however desirable, in order to maintain neatness in the signals which correspond to the regulations of international air navigation, to choose K, so that the curve of the field modulated at 90 cycles locates itself toward the middle of the interval comprised between the curves corresponding to $K=1.25$ and $K=2.65$. A wide range of possibilities for adjustment leading to the best possible results is thus obained.

Another advantage of the device according to the present invention consists in the possibility of limiting the detrimental effects that produces with present day devices the presence of a thick layer of snow on the ground where the system of antennae is erected. In fact, the comparative study of the curves on Figs. 4 and 5 shows that in the case of Fig. 4 a layer of snow 60 centimeters thick causes at the passage of the loop 2 of the field modulated at 150 cycles a considerable decrease of the difference in level, which is capable of causing on the indicator board a pseudo zero and in consequence accidents on landing. On the contrary, with a layer of snow of an equal thickness the device of Fig. 2 enables to obtain a difference in level much greater in the neighbourhood of the highest loops of the field modulated at 150 periods.

While the principles of the invention have been described above in connection with specific embodiments and particular modifications thereof, it is to be clearly understood that this description is made only by way of example and not as a limitation on the scope of the invention.

What is claimed is:

In a landing system using an array of aerials for radiating two fields of electro-magnetic waves modulated with different characteristic signals, which waves are reflected from ground and in which the landing trajectory is determined by the equality of the different signals comprising the modulation of said waves, an aerial system comprising, a first antenna mounted at a height $h$ above the effective ground plane, means for supplying energy modulated with one of said characteristic signals to said first antenna, second and third antennae disposed above said first antenna at heights of $4h$ and $8h$ respectively, and means for supplying energy modulated with the other characteristic signal to said second and third antennae.

EMILE RICHON.

References Cited in the file of this patent

UNITED STATES PATENTS

| Number | Name | Date |
|---|---|---|
| 2,379,442 | Kandoian | July 3, 1945 |
| 2,406,876 | Watts | Sept. 3, 1946 |